(12) United States Patent
Xu et al.

(10) Patent No.: US 9,444,806 B2
(45) Date of Patent: Sep. 13, 2016

(54) METHOD, APPARATUS AND SERVER FOR IDENTITY AUTHENTICATION

(71) Applicant: TENCENT TECHNOLOGY (SHENZHEN) COMPANY LIMITED, Shenzhen (CN)

(72) Inventors: Dong Shan Xu, Shenzhen (CN); He Tao Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 2 days.

(21) Appl. No.: 14/625,787

(22) Filed: Feb. 19, 2015

(65) Prior Publication Data

US 2015/0163216 A1    Jun. 11, 2015

Related U.S. Application Data

(63) Continuation of application No. PCT/CN2014/082448, filed on Jul. 18, 2014.

(30) Foreign Application Priority Data

Jul. 24, 2013   (CN) .......................... 2013 1 03139187

(51) Int. Cl.
*H04L 29/06*    (2006.01)

(52) U.S. Cl.
CPC ............ *H04L 63/08* (2013.01); *H04L 63/062* (2013.01); *H04L 63/068* (2013.01); *H04L 63/0876* (2013.01); *H04L 63/1466* (2013.01)

(58) Field of Classification Search
CPC .. H04L 1/0061–1/0066; H04L 9/065–9/0668; H04L 9/14–9/16; H04L 63/062; H04L 63/068; H04L 63/08; H04L 63/0876; H04L 63/1466; H04L 2209/16; G06F 21/31
See application file for complete search history.

(56) References Cited

U.S. PATENT DOCUMENTS

| | | | |
|---|---|---|---|
| 2002/0159588 A1* | 10/2002 | Kauffman | H04L 9/0662 380/28 |
| 2005/0129228 A1* | 6/2005 | LaGarde | G09C 1/02 380/42 |
| 2007/0186105 A1* | 8/2007 | Bailey | H04L 63/0492 713/168 |
| 2013/0073859 A1* | 3/2013 | Carlson | H04L 9/3247 713/176 |

* cited by examiner

*Primary Examiner* — Linglan Edwards
*Assistant Examiner* — Kevin Bechtel
(74) *Attorney, Agent, or Firm* — WPAT, PC; Justin King

(57) ABSTRACT

The disclosure relates to a method, apparatus and server for identity authentication, related to communication technique to solve system overload problem caused by invalid access ID attack. The method may include: a server receiving an API calling request from third party developer, the API calling request carrying access ID generated in advance by server and assigned to the third party developer; searching for a version character carried in the access ID; based on a version character generation rule, verifying whether the version number marked by the version character being the same as a version number of the check character generation rule used by the server; when the version character being verified successfully, searching for at least a check character carried in the access ID; and based on the check character generation rule, verifying respectively on the at least a check character. The disclosure is applied to API calling request process.

10 Claims, 14 Drawing Sheets

Version character generation group: {c, f}

First check character generation group: {2, j, 6} second check character generation group: {8, r, 1, 4, 9, k, q, a, 3, B, z, Z, 7, m, N, C, y, E, I, d, P, x, A, F}

Version character generation group: {c, f, 2, j, 6, 8, r, 1, 4}

First check character generation group: {9, k, q, a, 3, B, z, Z, 7, m}

Second check character generation group: {N, C, y, E, I, d, P, x, A, F}

METHOD, APPARATUS AND SERVER FOR IDENTITY AUTHENTICATION

CROSS-REFERENCE

This application is a U.S. continuation application under 35 U.S.C. §111(a) claiming priority under 35 U.S.C. §§120 and 365(c) to International Application No. PCT/CN2014/082448 filed on Jul. 18, 2014, which claims the priority benefit of Chinese Patent Application No. CN2013103139187, filed on Jul. 24, 2013, which are hereby incorporated herein by reference in its entirety.

DATA FIELD OF THE INVENTION

The present disclosure relates to the field of communication techniques, and in particular to a method, an apparatus and a server for identity authentication.

BACKGROUND OF THE INVENTION

As internet technology rapidly progresses, network-side servers opening the cloud platform to the third party developers has become a trend in information construction. The network-side servers provide the third party developers with an application programming interface (API) for requesting resource. The third party developers execute API calls to the servers when requesting resources, and use the servers API to process the related data.

To ensure the security of API calls, prior to calling API, the network-side server must authenticate the identity of the third party developer. Only after the authentication is successful, the server will allow the third party developer to call API. In general, prior to calling API, the server will assign an access identity (access ID) and an encryption key to an authorized third party developer. When calling API, the calling request from the third party developer carrying the access ID and a digital signature generated according to the encryption key will be transmitted to the server. During identity authentication, the server executes the replay attack, calling frequency and digital signature on the calling request of the third party developer. The server will only provide API to the third party developer after passing all the above verifications. Specifically, after receiving API calling request, the server visits a storage system to verify whether the request is a replay attack. If the request is not a replay attack, the server further verifies whether the calling frequency of the request. After passing calling frequency verification, the server transmits the API data involved in the request to an API audit system for auditing and updates the calling frequency record in a frequency control system. In digital signature verification, the server visits the storage system to retrieve the encryption key corresponding to the access ID, generates a server-side digital signature according to the encryption key, and compares the generated server-side digital signature against the digital signature carried by the API calling request. If the same, the server provides the API to the third party developer.

In realizing the above identity authentication process, the known technique shows the following disadvantage. The server must visit API audit system, frequency control system and storage system during authentication process. If an unauthorized third party developer or a malicious hacker creates a large number of invalid access IDs to attack the server, the server will visit the above three system frequently, which leads to system performance bottleneck or even denial of service (DoS) to cause the system breakdown.

SUMMARY OF THE INVENTION

The present disclosure is to provide a method, an apparatus and a server for identity authentication, able to solve the problem of system overload caused by attack of a large number of invalid access IDs.

Technical solutions provided by embodiments of the present disclosure include:

A method for identity authentication, at a server, may include: receiving an API calling request from a third party developer, the API calling request carrying an access ID generated in advance by the server and assigned to the third party developer; searching for a version character carried in the access ID, the version character being for marking a version number of a check character generation rule; based on a version character generation rule, verifying whether the version number marked by the version character being the same as a version number of the check character generation rule used by the server; when the version character being verified successfully, searching for at least a check character carried in the access ID; based on the check character generation rule, verifying respectively on the at least a check character.

An apparatus for identity authentication may include: a receiving unit, configured to receive an API calling request from a third party developer, the API calling request carrying an access ID generated in advance by a server and assigned to the third party developer; a searching unit, configured to search for a version character carried in the access ID received by the receiving unit, the version character being for marking a version number of a check character generation rule; a first verification unit, configured to verify whether the version number marked by the version character found by the searching unit being the same as a version number of the check character generation rule used by the server, based on a version character generation rule; the searching unit also configured to search for at least a check character carried in the access ID when the version character being verified successfully by the first verification unit; a second verification unit, configured to verify respectively on the at least a check character found by the searching unit based on the check character generation rule.

A server, may include an input/output circuit, a memory, a processor and a bus for connecting the input/output circuit, the memory and the processor, wherein: the input/output circuit is configured to receive an API calling request from a third party developer, the API calling request carrying an access ID generated in advance by the server and assigned to the third party developer; the memory is configured to store a version character generation rule, a check character generation rule and a version number of the check character generation rule; and the processor is configured to search for a version character carried in the access ID received by the input/output circuit, the version character being for marking a version number of a check character generation rule; based on the version character generation rule stored in the memory, verify whether the version number marked by the version character being the same as the version number of the check character generation rule stored in the memory; when the version character being verified successfully, search for at least a check character carried in the access ID; and based on the check character generation rule stored in the memory, verify respectively on the at least a check character.

The method, the apparatus and the server for identity authentication provided by various embodiments of the present disclosure are able to perform identity authentication on the access ID carried in the API calling request before performing replay attack verification on the API calling request. The server searches for the version character for marking the version number of the check character generation rule; and based on the version character generation rule, verifies whether the version number marked by the version character is the same as the version number of the check character generation rule used by the server. The verification operation is to verify the version of the check character generation rule. If the version number marked by the version character is different from the version number of the check character generation rule used by the server in generating the access ID, the access ID is an unauthorized access ID. If the verification result shows the two version numbers are the same, the version character verification is successful and then the server performs verification on the at least a check character in the access ID. The server searches for the at least a check character in the access ID; and based on the check character generation rule, performs verification respectively on the at least a check character. When each of the at least a check character is successfully verified, the access ID is an authorized ID. Compared to the known technique where the replay attack verification is directly performed according to the API calling request, the embodiments of the present disclosure can eliminate API calling requests carrying unauthorized access ID before performing the step of replay attack verification to the access ID, and only performs the replay attack verification when the access ID in the API calling request is authorized. As such, the number of visits to the API audit and other systems by the server is reduced so as to eliminate the impact on the system load caused by the large number of malicious invalid access IDs from the third-parties.

DETAILED DESCRIPTION OF PREFERRED EMBODIMENTS

The embodiment of the present disclosure can be implemented in numerous ways, including as a process, an apparatus, a system, a computer-readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configure to perform a task may be implemented as a general component that is temporarily configured to perform the task at a given time or a specific component that is manufactured to perform, the task. As used herein, the term 'processor' refers to one or more devices, circuits, and/or processing cores configured to process data, such as computer program instructions.

The following refers to drawings in the embodiments to provide a clear and complete description of the techniques disclosed in the embodiments. Apparently, the embodiments described below show only some exemplary embodiments, instead of all embodiments, of the present disclosure. Based on these embodiments of the present disclosure, all other embodiments which may be easily obtained by those having ordinary skills in the art without paying any creative effort all also within the scope of the present disclosure.

Figure 1:
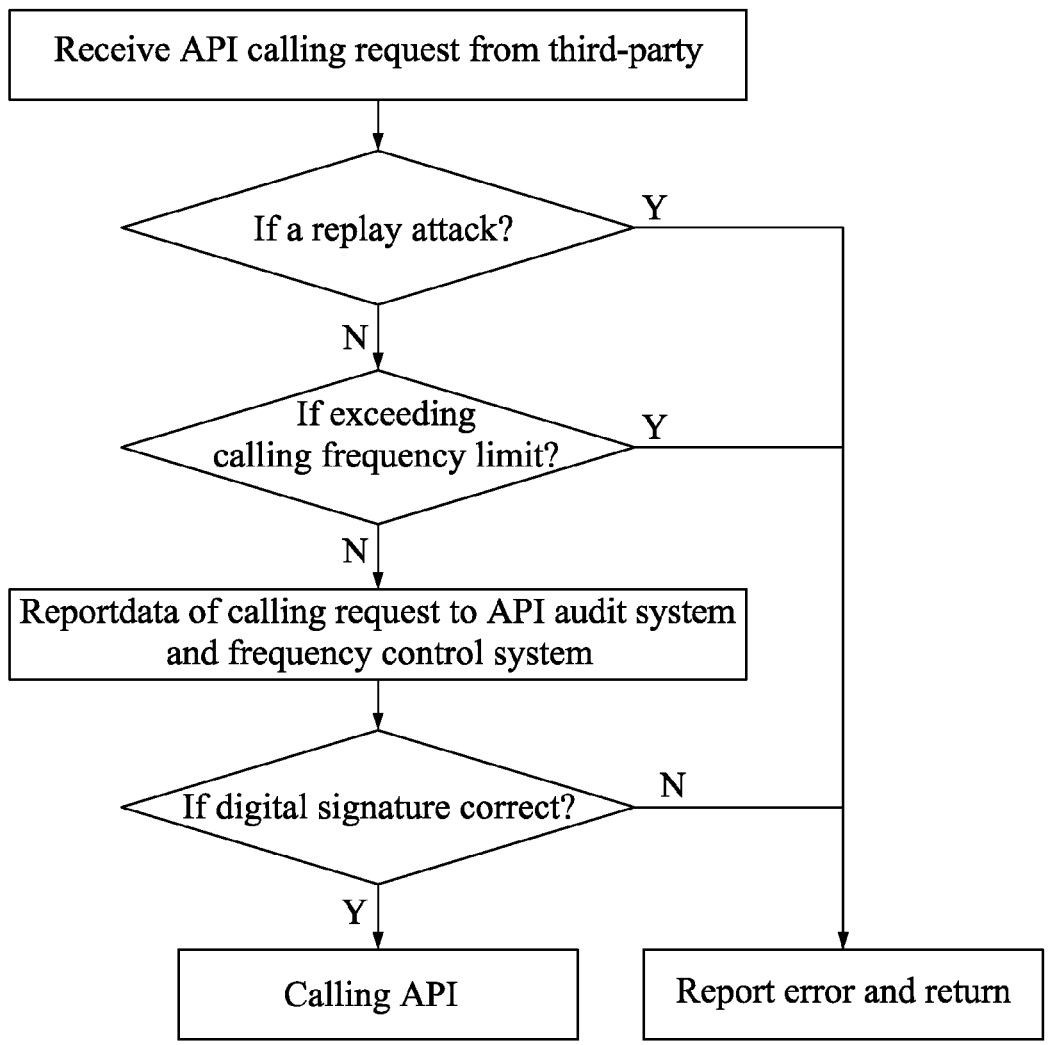
FIG. 1 is a flowchart of the API calling request verification of known technique.

A brief introduction of the API calling process is explained before describing the embodiments. As shown in FIG. 1, after receiving an API calling request from a third party developer, the server first verifies whether the API calling request is a replay attack. For replay attack verification, the server must visit the storage system. If the API calling request is a replay attach, then the process reports error and returns. If not a replay attack, the server performs the next verification of calling frequency. The object of calling frequency verification is to restrict the number of calling requests by an Internet Protocol (IP) address. For example, when an IP address executes 60 calling requests within a minute, the 61st calling request by the IP address will not pass the calling frequency verification, and the process reports error and returns. If the calling request passes the calling frequency verification, the server will report the data of the calling request to the API audit system and frequency control system, and proceeds to the digital signature verification. During digital signature verification, the server obtains a digital signature in the calling request provided by the third party developer, and then visits the storage system to obtain the encryption key corresponding to the access ID in the calling request and to generate a digital signature according to the obtained encryption key. Finally, the server compares the generated digital signature against the digital signature provided by the third party developer. If the two digital signatures are the same, the server assigns API to the third party developer; otherwise, the process reports error and returns.

As shown in the above process, when the third party developer requests API calling, the server must visit the API audit system, frequency control system and storage system a plurality of times. If the third party developer issues a large number of API calling requests carrying malicious invalid access IDs to the server, the server must visit the above systems frequency, which may lead to system performance bottleneck or even breakdown.

Figure 2:
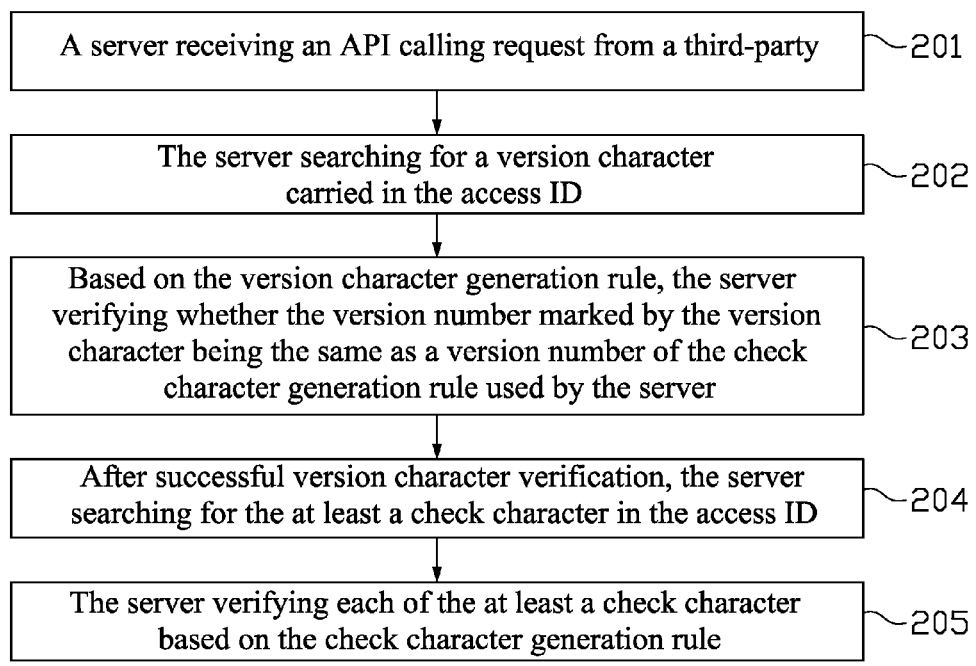
FIG. 2 is a flowchart of the method for identity authentication according to an embodiment of the present disclosure.

To eliminate the impact on the system load caused by large number of invalid API calling requests, the present disclosure provides a method for identity authentication. The method is applicable to the server side, and is to authenticate the access ID before performing replay attack verification. As shown in FIG. 2, the method may include following steps:

In step 201, a server receives an API calling request from a third party developer.

The third party developer issues an API calling request to the network-side server to request for calling the related source data of API. The API calling request carries an access ID generated in advance by the server and assigned to the third party developer.

Before the third party developer requests for calling API, the server must generate an authorized access ID in advance and assign to the authorized third party developer. When issuing calling request, the third party developer adds the access ID assigned by the server to the API request, and the server performs identity authentication on the access ID.

In the instant embodiment, only the access ID issued by the authorized third party developer can pass the authentication performed by the server. Because the access ID, such as randomly generated access ID, issued by the unauthorized third party developer is different from the access ID generated by the server, the unauthorized access ID will not be able to pass the authentication and the server will not perform subsequent replay attack and other verifications to the corresponding API calling request. As such, the system load caused by the invalid API calling request is eliminated.

In step 202, the server searches for a version character carried in the access ID.

When the server generates the access ID for authorized third party developer, the server will dispose a version character and at least a check character in the access ID, wherein the version character is for marking the version number of the check character generation rule, and the check character is for verifying the other characters in the access ID (the version character, in addition to marking the version number, is also able to verify a part of characters in the access ID). When the server generates access ID, the server generates a version character based on the version character generation rule, and generates at least a check character based on the check character generation rule. Then, the server disposes the version character and the check characters into predefined positions in the access ID.

In the instant embodiment, the server can store a plurality of version character generation rules and a plurality of check character generation rules in advance, and during access ID generation, the server selects a version character generation rule and a check character generation rule according to the configuration of the network administrator or a script program. The instant embodiment imposes no restriction on the type and number of the version character generation rules and check character generation rules.

When the third party developer issues API calling request, the server performs verification on, in the order of, the version character and then the check character in the access ID. In other words, based on the version character generation rule, the server first verifies whether the version number of the check character generation rule is the same as the version number of the check character generation rule used by the server. Then, based on the check character generation rule, the server verifies sequentially to each of the at least a check character. The object of the step is to search for the version character before verification in order to perform subsequent verification.

In step 203, based on the version character generation rule, the server verifies whether the version number marked by the version character being the same as a version number of the check character generation rule used by the server.

According to the version character generation rule used in generating version character, the server analyzes the version character to obtain the version number of the check character generation rule. If the obtained version number is different from the version number of the check character generation rule used by the server, the access ID carried in the API calling request is unauthorized, and the server reports error and returns. If the two version numbers are the same, the server continues to execute step 204. For example, in generating access ID, the server generates two check characters based on the check character generation rule 4, and generates a version character based on the version character generation rule 1 and the version number 4 of the check character generation rule. When authenticating access ID, if the server obtains the version number is 4 based on the version character generation rule 1, the version character verification is successful. If the server obtains the version number is 3, instead of 4, based on the version character generation rule 1, the version character verification failed.

In actual application, the possibility of verification failure of version character exists. For example, the server uses check character generation rule 4 to generate the check characters. After sending off the generated access ID to the third party developer, the check character generation rule 4 is maliciously hacked and the server uses a new check character generation rule, such as, check character generation rule 3, to generate the new access ID and send to the third party developer. If the third party developer uses the invalid access ID, i.e., the access ID generated by the check character generation rule 4, in calling API, the version character verification in this step will fail.

In step 204, after successful version character verification, the server searches for the at least a check character in the access ID.

After the version character verification is successful, the server will perform verification on the at least a check character based on the check character generation rule used in generating access ID. The object of this step is to find the check characters for subsequent verification.

In step 205, the server verifies each of the at least a check character based on the check character generation rule.

In generating access ID, for example, if the server uses check character generation rule 2 to generate the check character. In this step, the server performs verification, the server then performs verification on each of the at least a check character based on the check character generation rule 2 in this step. If each of the at least a check character is successfully verified, the access ID in the API calling request is authorized access ID, and the server continues to execute replay attack verification on the API calling request. If any of the at least a check character fails the verification, the server reports error and returns. In the instant embodiment, the statement that each of the at least a check character is successfully verified means the check character is successfully verified when there is only one check character, and all the check characters are successfully verified when there are two or more check characters.

In the instant embodiment, the check character is obtained according to the other characters in the access ID, and the check character is related to the other characters. If the check character is successfully verified, the characters in the access ID from the third party developer will be respectively the same as the characters in the access ID generated by the server for the authorized third party developer, and therefore the access ID is authenticated. If the check character fails the verification, at least one of the characters in the access ID from the third party developer will be different from the corresponding character in the access ID generated by the server for the authorized third party developer, and therefore the access ID is unauthenticated. The aforementioned other characters described in the instant embodiment refer to the characters in the access ID other than the version character and the check character. In the following description, the other characters are referred to as secondary characters.

The method for identity authentication provided by the embodiments of the present disclosure authenticate the access ID in the API calling request before performing replay attack verification. During authentication, the server first verifies the version character in the access ID. After the version character is verified successfully, the server proceeds to verify the check character in the access ID. When each of the check characters is verified successfully, the access ID is authenticated. Compared to the known technique wherein the replay attack verification on the API calling request is directly executed, the present disclosure can authenticate the access ID in the API calling request before performing replay attack verification, and stops the subsequent verification processes if the access ID fails the authentication. As such, the impact on system load caused by large number of invalid API calling requests will be eliminated to ensure system normal operation.

In addition, the method for identity authentication provided by the embodiments of the present disclosure can also effectively prevent the unauthorized third party developer or hacker from decoding access ID by brute force. Take the 32-character access ID as an example. Besides the version character and the check character, each secondary character may randomly hold the value of 1-9, a-z and A-Z (i.e., 62 different values). If the access ID includes a version character and two check characters, the brute force approach must perform $62^{29}$ iterations (i.e. about $10^{51}$) to crack the access ID. Furthermore, the hacker must also obtain the version character generation rule and the check character generation rule for cracking the access ID. Even without considering the generation rules, the computation speed of the current computers will take a time longer than the expiration time of the access ID to compute. Therefore, the result is preventive.

Figure 3:
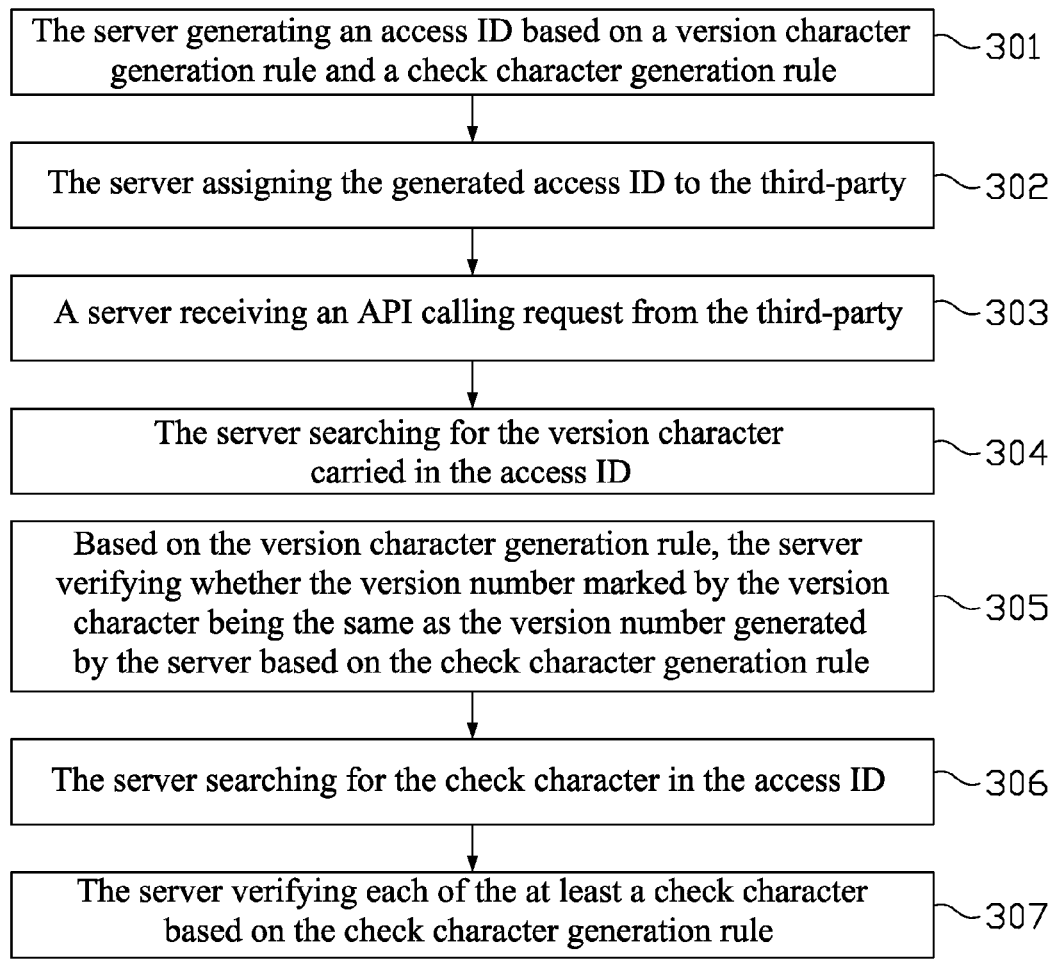
FIG. 3 is a flowchart of the method for identity authentication according to another embodiment of the present disclosure.

Furthermore, for expansion on the method disclosed in FIG. 2, the present disclosure further provides another embodiment of the method for identity authentication. The method is also applicable to the server side and for authenticating the access ID before replay attack verification. As shown in FIG. 3, the method may includes following steps:

In step 301, the server generates an access ID based on a version character generation rule and a check character generation rule.

The server first generates a valid access ID for an authorized third party developer so that the third party developer can request API from the server based on the access ID. In the instant embodiment, step 301 and step 302 are for the server to generate and assign the access ID before authenticate the access ID.

Specifically, take 32-character access ID as an example. The process of the server generating the access ID may include:

In step 301*a*, the server selects a version character and at least a check character.

Figure 4:
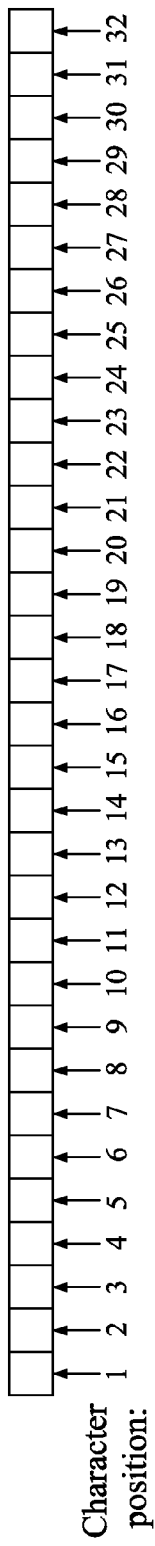
FIG. 4 is a schematic view showing the 32-character access ID according to an embodiment of the present disclosure.

As shown in FIG. 4, the server first generates a 32-character access ID, wherein no specific value is assigned to each character. Then, the server selects a character as version character and at least a character as check character. In the instant embodiment, one version character and two check characters are selected.

The server can select the version character and the check character according to the configuration of the network administrator or default script program. For example, three characters can be randomly selected as version character and check characters respectively. Alternatively, the server can select one character every 10 characters. For example, as shown in Figure, the server selects the character at position 3 (referred to as character 3) as version character, and character 14 and character 28 as check characters.

In step 301*b*, the server selecting a plurality of characters from an initialized character array as the value held in each of the secondary characters in the access ID.

Figure 5:
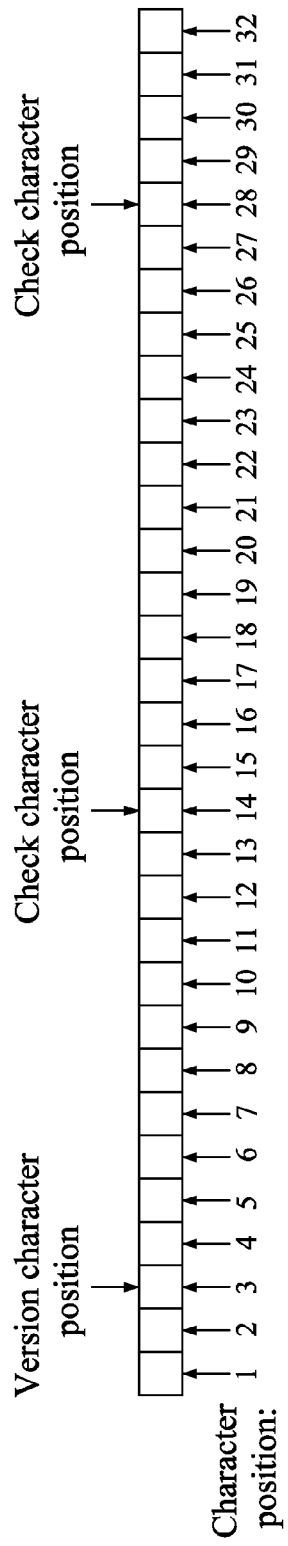
FIG. 5 is a schematic view showing the access ID after confirming the positions of the version character and the check characters according to an embodiment of the present disclosure.

As aforementioned, the secondary characters refer to the characters in the access ID other than the version character and the check character. In FIG. 5, characters 1-2, characters 4-13, characters 15-27, and characters 29-32 are secondary characters.

Figure 6:
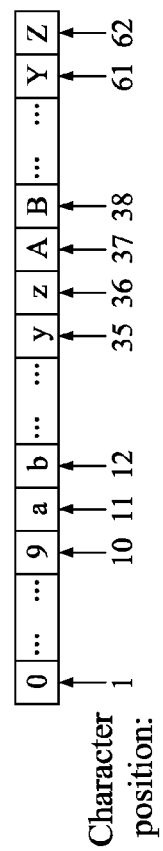
FIG. 6 is a schematic view showing an initialized character array according to an embodiment of the present disclosure.

The initialized character array is for generating specific character value for the access ID, which is constructed by the server in advance. As shown in FIG. 6, the initialized character array includes numbers 0-9, low case letters a-z and upper case letters A-Z, a total of 62 character values. The initialized character array shown in FIG. 6 is only for illustrative purpose. In actual application, the present disclosure imposes no specific restriction on the content and the order of the character values in the initialized character array.

Figures 7, 8:
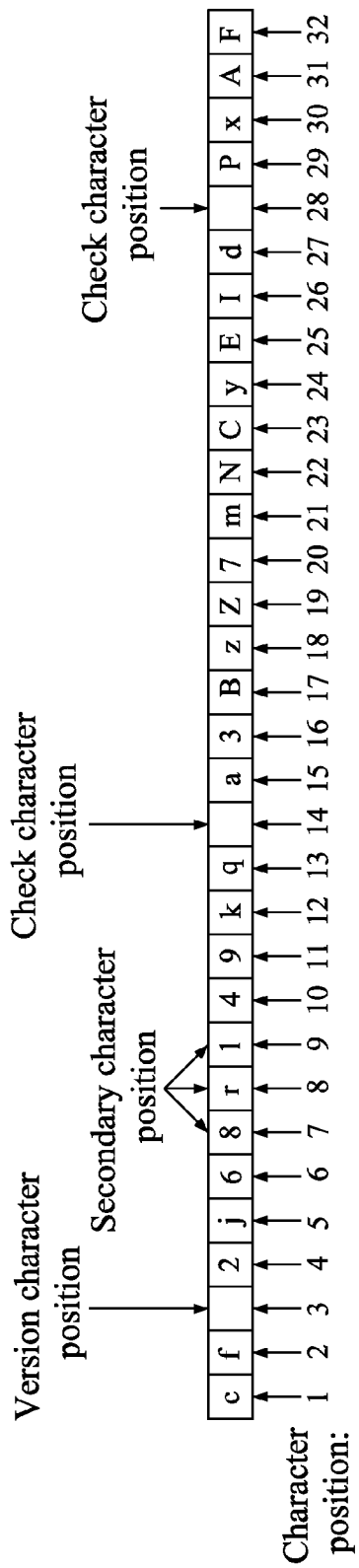
FIG. 7 is a schematic view showing the access ID after confirming the secondary characters according to an embodiment of the present disclosure.
FIG. 8 is a schematic view showing the generation character set according to an embodiment of the present disclosure.

The server selects a character value from the initialized character array for each secondary character of the access ID according to a default rule. In the instant embodiment, the default rule is random selection. The server randomly selects a character value for character 1, and so on, until all the secondary characters hold a character value, as shown in FIG. 7.

In step 301c, the server dividing the plurality of secondary characters into at least two character generation groups.

The at least two character generation groups include a version character generation group and a check character generation group. In the instant embodiment, the server divides the 29 secondary characters into a version character generation group and two check character generation groups.

Specifically, the server divides the secondary characters to obtain at least two character generation groups based on the number of the secondary characters, the number of the version character, and the number of check characters. In the instant embodiment, the number of the secondary characters is 29, the number of the version character is 1, and the number of check characters is 2. For example, the server first assigns the number of characters in each character generation group, and then starts with the first character in the access ID (excluding the version character and the check characters) to assign the secondary characters to the version character generation group and the check character generation group. The version character generation group and the check character generation group obtained by the server are shown in FIG. 8.

Figures 9, 10:
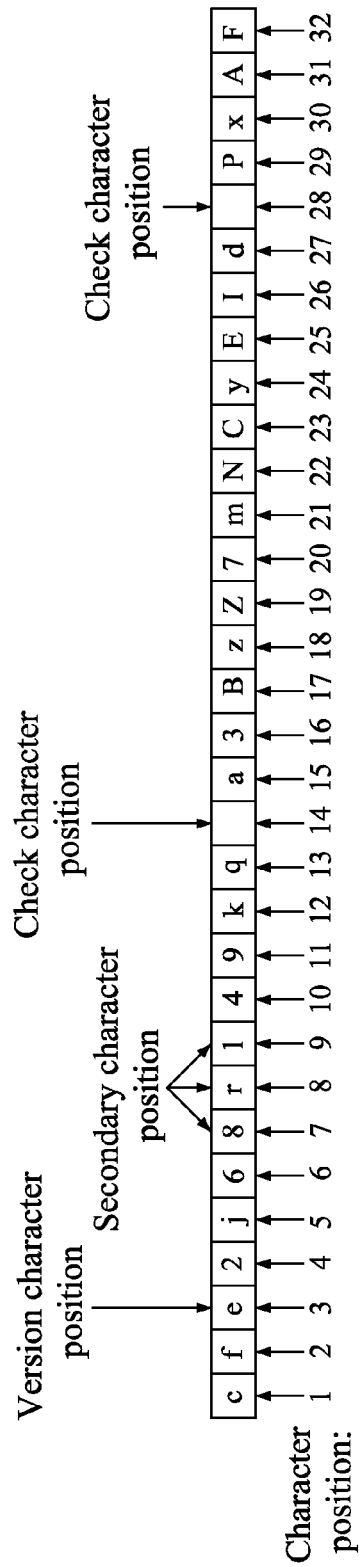
FIG. 9 is a schematic view showing the generation character set according to another embodiment of the present disclosure.
FIG. 10 is a schematic view showing the access ID after confirming the version character according to an embodiment of the present disclosure.

To further increase the difficulty of hacking, in a preferred embodiment of the present disclosure, the server assigns the number of characters to each group uniformly, for example, the version character generation group and the check character generation group shown in FIG. 9. If the server uses the division in FIG. 8, the hack needs to perform iterations, while iterations are required for using the division in FIG. 9. As shown, the uniform division approach requires more iterations to crack than the non-uniform division approach. For example, 1×2×9=18 (non-uniform division) and 4×4× 4=64 (uniform division). Apparently, the number of combinations of a uniform division is larger than the number of combinations of a non-uniform division.

The instant embodiment uses the 3 character generation groups in FIG. 9 in the following description.

In step 301d, the server generates the version character based on the version character generation group and the version character generation rule.

Specifically:

Step 1a, in the version character generation group, the server multiplies a numerical position of each character and the American Standard Code for Information Interchange (ASCII) code corresponding to the character to obtain a first-order version value.

The number of digits numerical position of the character can be either the numerical position of the character in the access ID or the numerical position of the character in the initialized character array. For example, for character "c", the numerical position of the character in the access ID is 1, but the numerical position of the character in the initialized character array is 13. The instant embodiment uses the numerical position of the character in the initialized character array for description.

For the version character generation group shown in FIG. 9, the server obtains 9 first-order version values: 13×99(c) =1287, 16×102(f)=1632, 3×50(2)=150, 20×106(j)=2120, 7×54(6)=378, 9×56(8)=504, 28×114(r)=3192, 2×49(1)=98, 5×52(4)=260, wherein the number to the left of the multiplication sign is the numerical position of the character in the initialized character array, the number to the right of the multiplication sign is the corresponding ASCII code, and the number inside the parentheses is the character.

The instant embodiment uses the decimal ASCII code as example for description. In actual application, the hexadecimal or octal ASCII code can also be used. No specific restriction is imposed by the present disclosure.

Step 2a, the server performs summation and modulus of 62 on the plurality of first-order version values to obtain a second-order version value.

The server computes the sum of the 9 first-order version values to obtain:

1278+1632+150+2120+378=504+3192+98+ 260=9621, and the computes the modulus of 62 to 9621 and obtains a second-order version value 11.

Step 3a, the server performs summation and modulus of 62 on the second-order version value and the version number of the check character generation rule to obtain a third-order version value.

For example, the server uses check character generation rule 4 in generating access ID, i.e., the check character generation rule has a version number of 4. The server uses the following equation to obtain a third-order version value: (11+4)/62=15, wherein the operator "/" indicates the modulus operation.

Step 4a: the server searching for the character in initialized character array having the same numerical position as the third-order version value and using the character as the version character.

The server finds the 15th character "e" in the initialized character array of FIG. 6 and uses "e" as the version character of the access ID. The access ID with confirmed version character is shown in FIG. 10.

In step 301e, the server generates at least a check character according to at least a check character generation group and the check character generation rule.

After generating the version character, the server uses the check character generation rule 4 to generate two check characters. Specifically:

Step 1b: in a check character generation group, the server multiplying a numerical position of each character and the American Standard Code for Information Interchange (ASCII) code corresponding to the character to obtain a first-order check value.

For the first check character generation group shown in FIG. 9 to obtain the first check character, the server obtains 10 first-order check values: 10×57(9)=570, 21×107(k) =2247, 27×113(q)=3051, 11×97(a)=1067, 4×51(3)=204, 38×(66)B=2508, 36×122(z)=4392, 62×90(Z)=5580, 8×55 (7)=440, 23×109(m)=2507, wherein the number to the left of the multiplication sign is the numerical position of the character in the initialized character array, the number to the right of the multiplication sign is the corresponding ASCII code, and the number inside the parentheses is the character.

Step 2b: the server performing summation and modulus of 62 on the plurality of first-order check values to obtain a second-order check value.

The server computes the sum of the 10 first-order check values to obtain:

570+2247+3051+1067+204+2508+4392+5580+440+ 2507=22566, and the computes the modulus of 62 to 22566 and obtains a second-order check value 10.

Step 3b: the server searching for the character in initialized character array having the same numerical position as the second-order check value and using the character as the first check character.

The server finds the 60th character "X" in the initialized character array of FIG. 6 and uses "X" as the first check character of the access ID.

Figure 11:
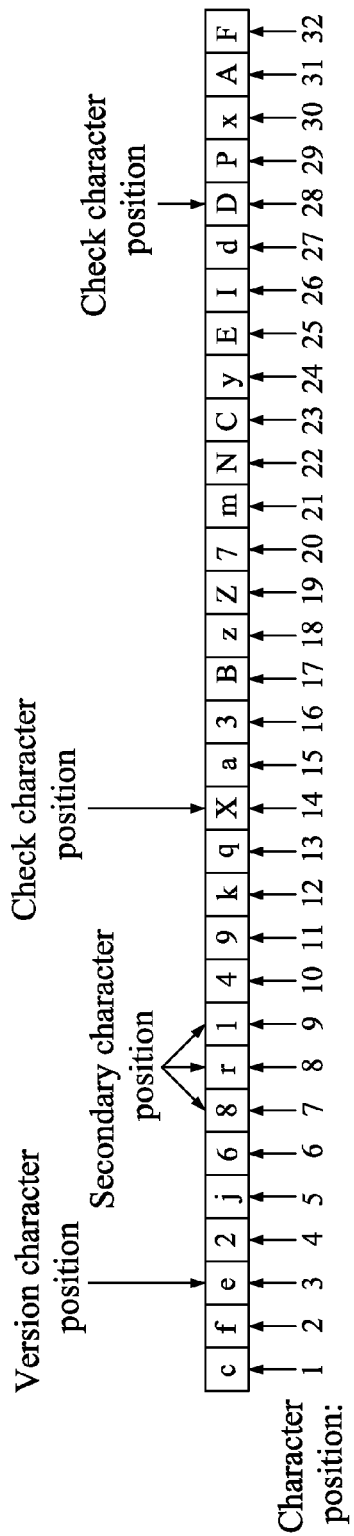
FIG. 11 is a schematic view showing the access ID after confirming the version character and check characters according to an embodiment of the present disclosure.

Then, the server executes step 1b and step 2b to obtain the second check character "D". The access ID with confirmed check characters is shown in FIG. 11, wherein the access ID is a complete access ID.

In step 302, the server assigns the generated access ID to the third party developer.

The server sends the generated access ID to the third party developer for subsequent API calling request by the third party developer.

In step 303, a server receives an API calling request from the third party developer.

When the third party developer issues an API calling request, the server retrieves the access ID in the API calling request. The access ID is the access ID assigned to the authorized third party developer by the server in step 302.

In step 304, the server searches for the version character carried in the access ID.

Based on the version character generation rule in step 301a, the server confirms that the third character "e" in the access ID as the version character.

In step 305, based on the version character generation rule, the server verifies whether the version number marked by the version character being the same as the version number generated by the server based on the check character generation rule.

Specifically, step 305 may include:

In step 305a, the server uses a reverse rule of the version character generation rule to analyze the version character "e" to obtain a version number.

The server first finds the position of character "e" as 15 in the initialized character array, and then follows step 1a and step 2a of step 301d to compute the sum of the multiplications of each character in the version character generation group and corresponding ASCII code, followed by computing the modulus of 62 to obtain the second-order version value 11. The server then subtracts the second-order version value 11 from the position 15 of character "e" to obtain the version number as 4. In the instant embodiment, if the subtraction results in a negative number, the value 62 is added to the negative number to obtain the version number.

In step 305b, the server determines whether the analyzed version number is the same as the version number generated by the server using the check character generation rule and obtaining a result.

In the instant embodiment, because the third party developer requesting API calling is an authorized third party developer, the access ID is an authorized ID and the version number 4 analyzed by the server is the same as the version number of the check character generation rule t4 used in step 301e. When an unauthorized third party developer or a hacker try to crack the access ID through brute force, the version number analyzed by the server will be different from the version number used by the server as long as any character in the version character generation group used by the hacker is different from the version character generation group used by the server.

In the instant embodiment, the version character verification can also verify the 9 characters in the version character generation group in addition to verifying whether the marked version number is the same as the version number used by the server.

When the server determines the analyzed version number is the same as the version number used by the server, the method proceeds to execute step 306 to verify the check characters. When the server determines the analyzed version number is different from the version number used by the server, the method confirms that the access ID from the third party developer is an unauthorized access ID and the server reports error and returns.

In step 306, the server searches for the check character in the access ID.

Based on the check character generation rule in step 301a, the server confirms that the 14th character "X" and the 28th character "D" in the access ID as the first and the second check character, respectively.

In step 307, the server verifies each of the at least a check character based on the check character generation rule.

The object of the check character verification is to verify the secondary characters in the access ID. Because a check character is generated according to 10 secondary characters, the check character analyzed by the server will be different from the generated check character if any of the 10 secondary characters is different from the secondary characters generated by the server. Therefore, this step can detect the correctness of the access ID. Take verifying the first check character as example:

Step 1c: the server analyzing to obtain the check character based on the check character generation rule.

Based on the check character generation rule 4 used when generating the check character, the server analyzes to obtain the check character. Specifically, the server obtains 11th-21st characters from the access ID (excluding 14th character, check character), i.e., the first check character generation group shown in FIG. 9. Then, the server follows steps 1-3 of step 301e to analyze the obtained first check character generation group to obtain the first check character "X".

Step 2c: the server comparing the analyzed check character against the check character generated when generating the access ID.

Figure 12:
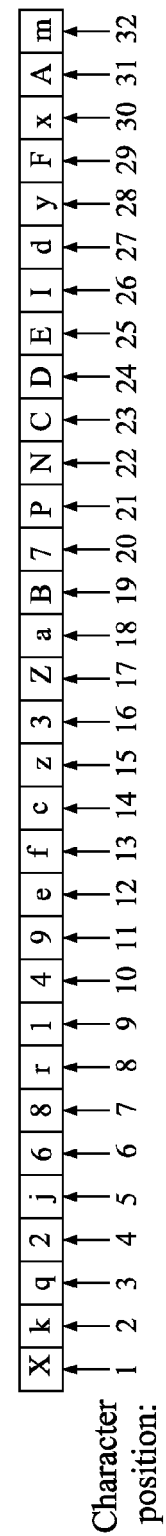
FIG. 12 is a schematic view showing the access ID randomly generated by a third party developer according to an embodiment of the present disclosure.

In this step, the objects compared by the server are the analyzed check character from step 1 and the check character generated by the server, respectively, wherein the check character generated by the server is also the 14th character "X" in the access ID. It should be noted that the analysis in step 1 is not merely to obtain the check character, which can be retrieved directly from the 14th character "X" in the access ID. Instead, the analysis by the server is to independently verify the access ID based on the check character generation rule, which is unknown to the third party developer. If the analysis results in the same check character, the secondary characters in the access ID are proven to be the same as the secondary characters in the generated access ID. In the instant embodiment, the description is based on the authorized access ID from the third party developer, and therefore, the check character from the access ID analyzed by the server must be the same as the generated check character. In other words, the check character resulted from the analysis of the server is the 14th character "X" in the access ID. However, when the access ID from the third party developer is an invalid access ID, the significance of the analysis and comparison can be clearly shown. For example, the third party developer randomly generates an access ID shown in FIG. 12. Because the characters in access ID do not correspond to the characters in the access ID generated by the server, the server can determines that the access ID is not an authorized access ID because the analyzed check character from the 11th-21st characters of the access ID (excluding 14th character) and the check character generation rule is different from the check character generated by the server.

After comparing the 14th character (i.e., the first check character), the server follows steps 1-2 to verify the 28th character (i.e., the second check character). When any of the check characters is different from the respective generated check character, the server determines the access ID is invalid and reports error and returns. When both check characters are verified successfully, the server determines the access ID is authorized.

Furthermore, in a preferred embodiment, when the check character generation rule 4 used by the server is hacked by the third party developer, the server can use a new check character generation rule to generate a new access ID, wherein in the new access ID, the new version character will be used for marking the version number of the check character generation rule. Then, the new access ID will be assigned and sent to the authorized third party developer. As aforementioned, the server stores a plurality of check character generation rules. In a preferred embodiment, when a previously used check character generation rule is cracked by a third party developer, the server can used a new check character generation rule, such as, check character generation rule 2, to generate a new access ID. In the new access ID, the version number of the check character generation rule 2 is realized in the new version character. For the third party developer cracked the check character generation rule 4, in the access ID generated according to the check character generation rule 4, the version number marked by the version character is the no longer valid version number 4. When an API calling request having the access ID arrives, the server will reports error and returns during the version character verification. As such, the access ID can be updated.

Furthermore, in an optional solution, after executing step 307 and the access ID is determined to be an authorized access ID, the server can follow the process outlined in FIG. 1 to perform replay attack verification, calling frequency verification and digital signature verification, and so on. The realization details will not be repeated here. When all the subsequent verification processes are successful, the server calls API for the third party developer.

The method for identity authentication provided in the embodiments uses the version character to verify the version number of the check character generation rule used by the access ID. When the version verification succeeds, the check character verification is executed. Because the check character is generated from the secondary characters, each of the secondary characters is also indirectly verified to achieve the identity authentication of the access ID. In addition, because the version character is also generated through the secondary characters, the version character verification can also verify the secondary characters in generating the version character in addition to verifying the version number of the check character generation rule.

Furthermore, the method for identity authentication provided in the embodiments can switch to another check character generation rule when the current check character generation rule is cracked and puts the version number of the new rule in the new access ID to assign to the authorized third party developer in order to invalidate the old access ID. As such, the difficulty of cracking access ID is increased.

The following analyzes the feasibility of the method in the embodiments. To crack the rules of the access ID requires knowing the exact numbers and positions of the version character and the check characters, as well as the numbers of the version character generation group and the check character generation groups. Take the embodiment with 32-character access ID, a version character, two check characters, a 9-character version character generation group and two 10-character check character generation groups as an example. Without considering the positions of the version character and the check characters and the combination of the character generation groups, the probability of a successful hacking is about:

In addition, because the number of version characters, the number of check characters, the number of characters in version character generation group and the number of characters in check character generation group are all variable, the probability of successful hacking is even lower. Besides, in actual application, the version character generation rule and the check character generation rule can also be flexibly changed. As a result, the hacking becomes extremely difficult.

Figure 13:
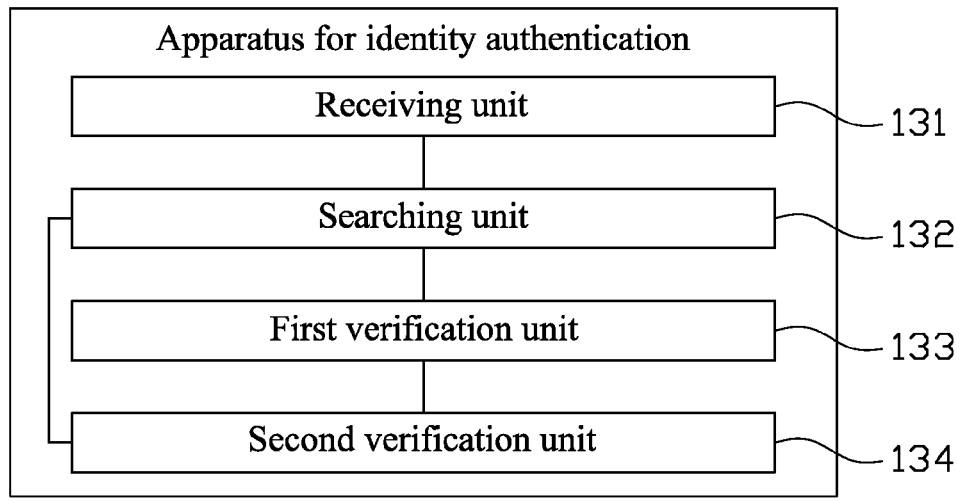
FIG. 13 is a schematic view showing structure of a first embodiment of an apparatus for identity authentication according to the present disclosure.

Referring to the realization of the method in FIG. 3, the present disclosure further provides an apparatus for identity authentication. The apparatus may be disposed inside the network-side server, for realizing the method shown in FIG. 3. As shown in FIG. 13, the apparatus may include: a receiving unit 131, a searching unit 132, a first verification unit 133 and a second verification unit 134, wherein:

the receiving unit 131 is configured to receive an API calling request from a third party developer, the API calling request carries an access ID generated in advance by a server and assigned to the third party developer;

the searching unit 132 is configured to search for a version character carried in the access ID received by the receiving unit 131, the version character is for marking a version number of a check character generation rule;

the first verification unit 133 is configured to verify whether the version number marked by the version character found by the searching unit 132 is the same as a version number of the check character generation rule used by the server, based on a version character generation rule;

the searching unit 132 is also configured to search for at least a check character carried in the access ID received by the receiving unit 131 when the version character is verified successfully by the first verification unit 133; and the second verification unit 134 is configured to verify respectively on the at least a check character found by the searching unit 132 based on the check character generation rule.

Figure 14:
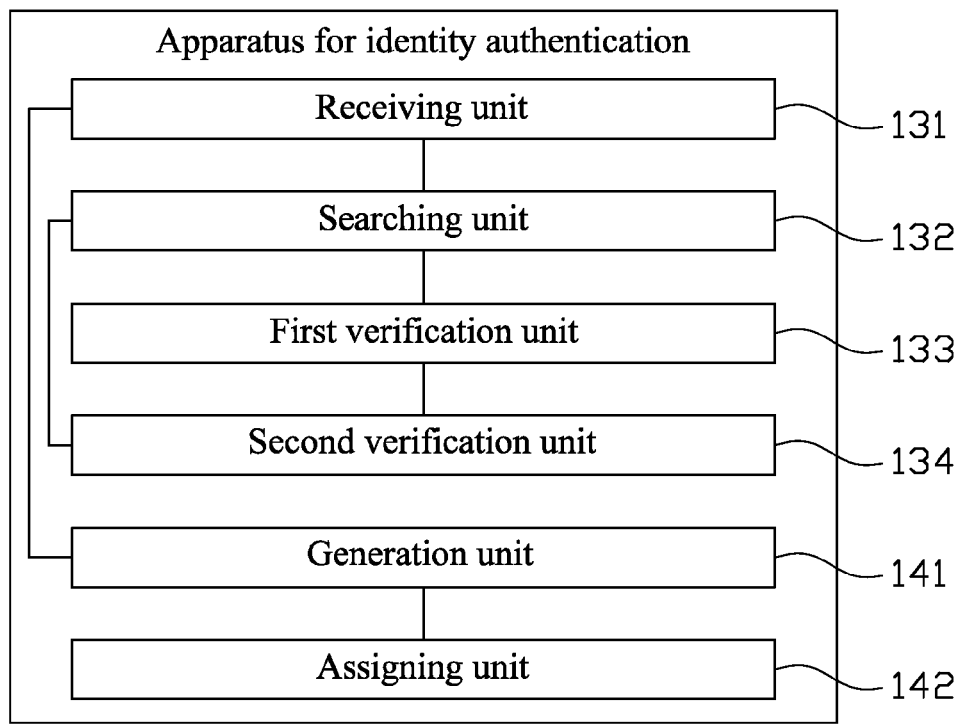
FIG. 14 is a schematic view showing structure of a second embodiment of an apparatus for identity authentication according to the present disclosure.

Furthermore, as shown in FIG. 14, the apparatus further may include a generation unit 141 and a assigning unit 142; wherein:

the generation unit 141 is configured to generate the access ID based on the version character generation rule and the check character generation rule before the receiving unit receives the API calling request from the third party developer; and the assigning unit 142 is configured to assign the access ID generated by the generation unit 141 to the third party developer.

Figure 15:
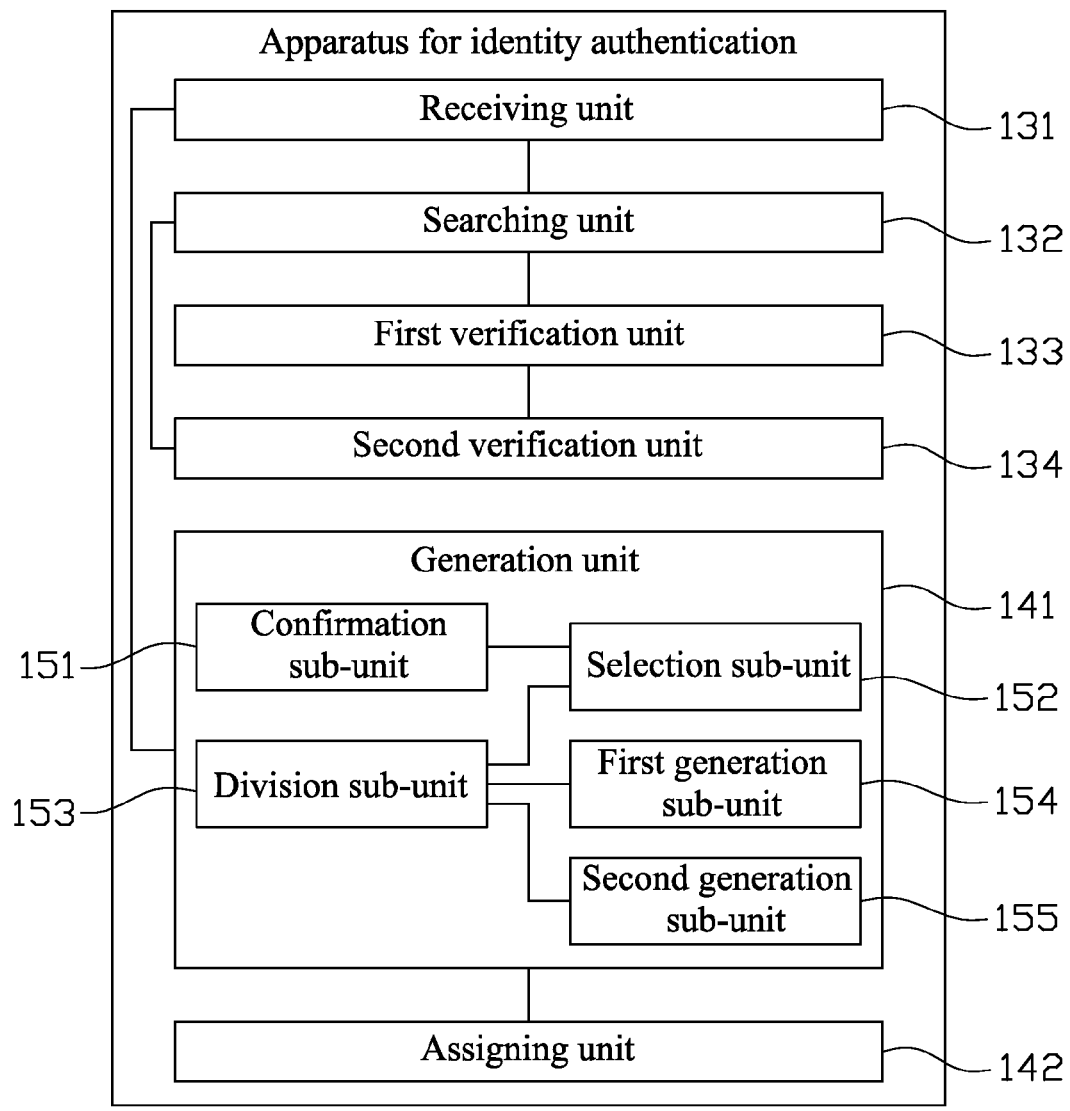
FIG. 15 is a schematic view showing structure of a third embodiment of an apparatus for identity authentication according to the present disclosure.

In addition, as shown in FIG. 15, the generation unit 141 may include a confirmation sub-unit 151, a selection sub-unit 152, a division sub-unit 153, a first generation sub-unit 154 and a second generation sub-unit 155; wherein, the confirmation sub-unit 151 is configured to confirm a position of a version character and a position of at least a check character;

the selection sub-unit 152 is configured to select a plurality of characters from an initialized character array as secondary characters in access ID, wherein the secondary characters are the characters in the access ID other than the version character and the check character confirmed by the confirmation sub-unit 151;

the division sub-unit 153 is configured to divide a plurality of secondary characters selected by the selection sub-unit 152 into at least two character generation groups, and the at least two character generation groups may include a version character generation group and at least a check character generation group;

the first generation sub-unit 154 is configured to generate the version character according to the version character generation group divided by the division sub-unit 153 and the version character generation rule; and the second generation sub-unit 155 is configured to generate the at least a check character according to the check character generation group divided by the division sub-unit 153 and the check character generation rule.

Figure 16:
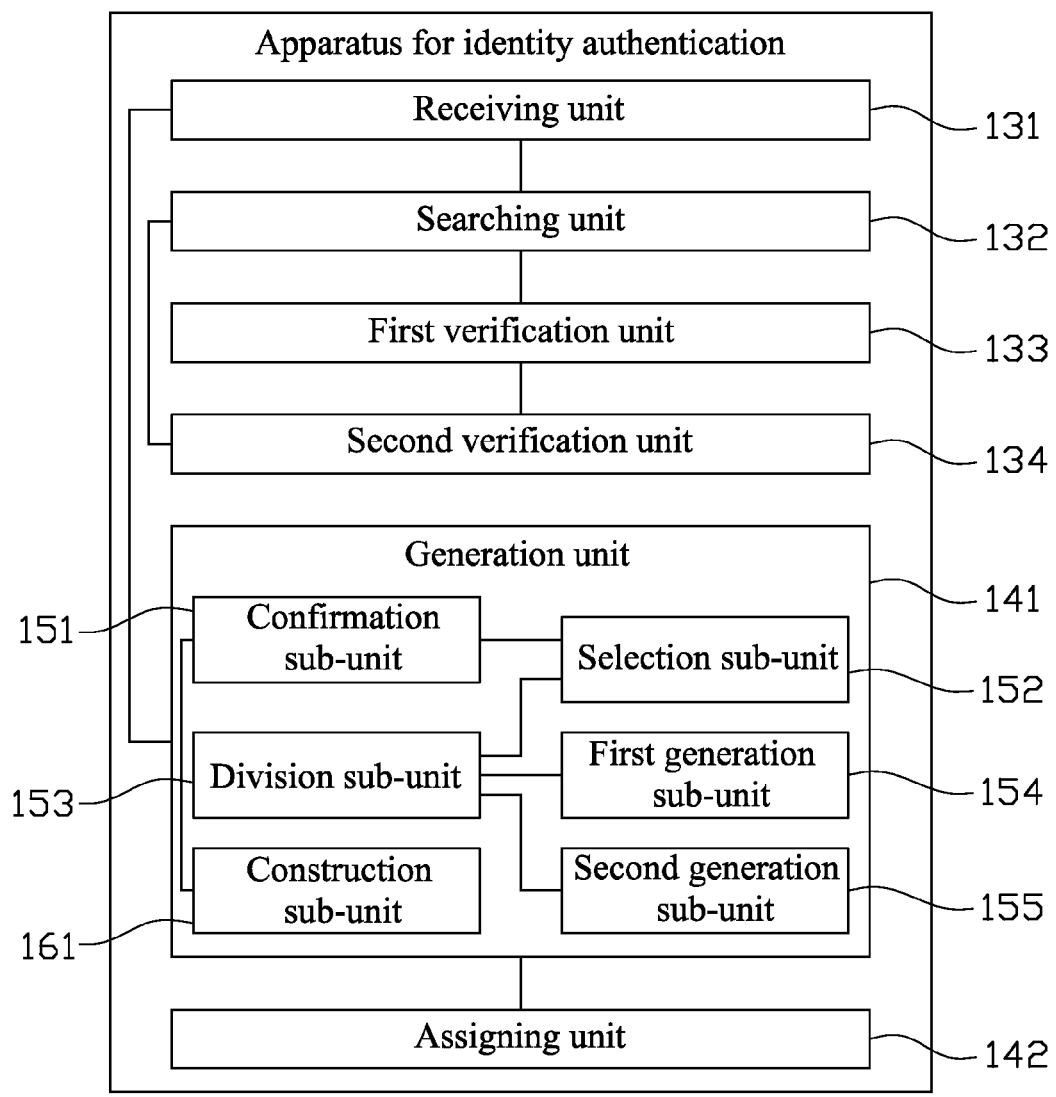
FIG. 16 is a schematic view showing structure of a fourth embodiment of an apparatus for identity authentication according to the present disclosure.

Furthermore, as shown in FIG. 16, the generation unit 141 further may include a construction sub-unit 161, wherein, the construction sub-unit 161 is configured to construct an initialized character array before the confirmation sub-unit 151 confirming the positions of the version character and the position of at least a check character, and the initialized character array may include digits 0-9, lower case letters a-z and upper case letters A-Z, a total of 62 characters.

Furthermore, the division sub-unit 153 divides the plurality of secondary characters to obtain at least two character generation groups according to the number of the secondary characters a, the number of version characters b and the number of check characters c.

Furthermore, the first generation sub-unit 154 is configured to:

in the version character generation group, multiply a position of each character and the American Standard Code for Information Interchange (ASCII) code corresponding to the character to obtain a first-order version value;

perform summation and modulus of 62 on the plurality of first-order version values to obtain a second-order version value;

perform summation and modulus of 62 on the second-order version value and the version number of the check character generation rule to obtain a third-order version value; and search for the character in initialized character array having the same position as the third-order version value and using the character as the version character.

Furthermore, the second generation sub-unit 155 is configured to:

in a check character generation group, multiply a position of each character and the American Standard Code for Information Interchange (ASCII) code corresponding to the character to obtain a first-order check value;

perform summation and modulus of 62 on the plurality of first-order check values to obtain a second-order check value; and search for the character in initialized character array having the same position as the second-order check value and using the character as the first check character.

Figure 17:
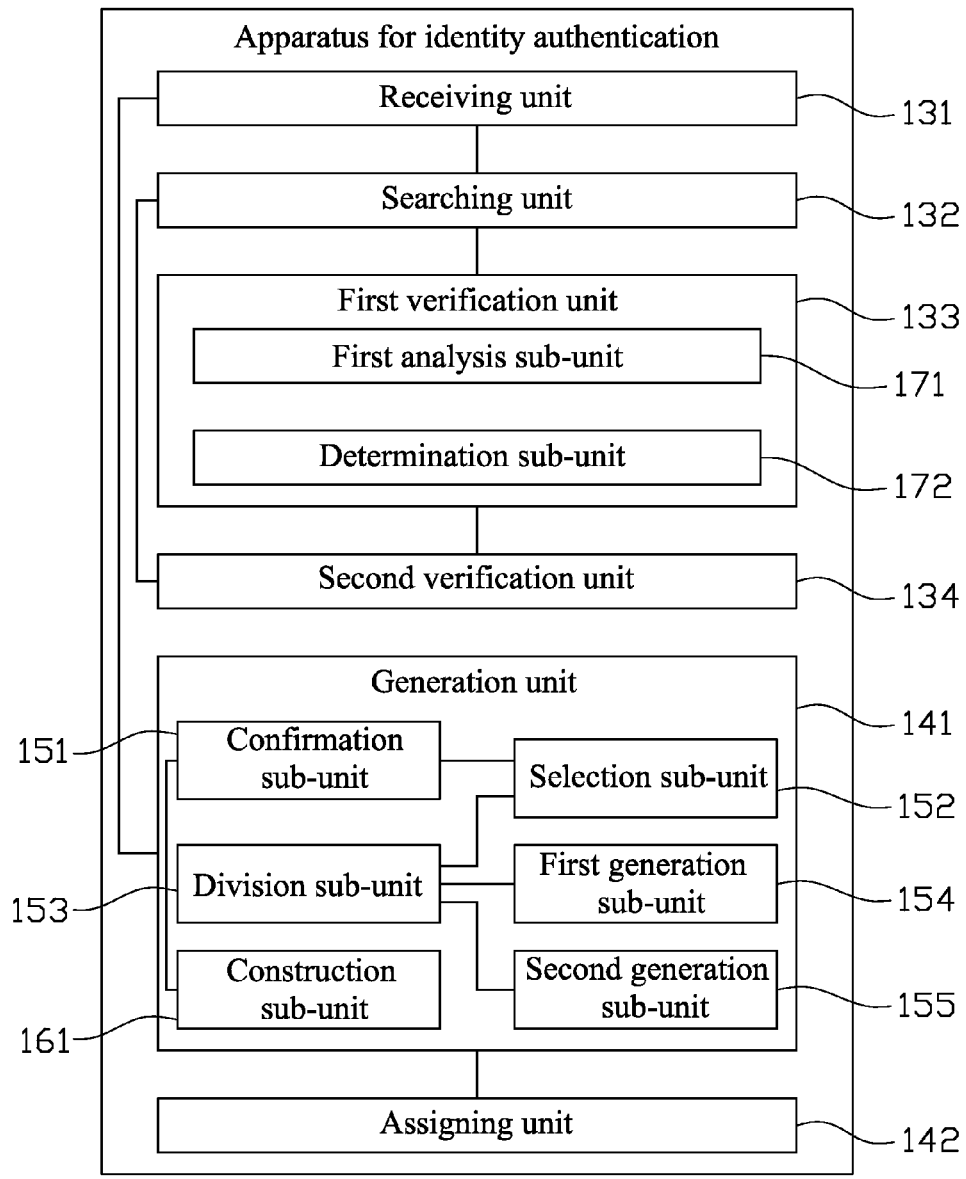
FIG. 17 is a schematic view showing structure of a fifth embodiment of an apparatus for identity authentication according to the present disclosure.

Furthermore, as shown in FIG. 17, the first verification unit 133 may include a first analysis sub-unit 171 and a determination sub-unit 172; wherein:

the first analysis sub-unit 171 uses a reverse rule of the version character generation rule to analyze the version character to obtain a version number;

the determination sub-unit 172 determines whether the analyzed version number obtained by the first analysis sub-unit 171 is the same as the version number generated by the server using the check character generation rule and obtains a result;

when the determination result is the same, the first verification unit 133 further instructs the second verification unit 134 to perform check character verification; and when the determination result is different, the first verification unit 133 determines the access ID is an unauthorized access ID.

Figure 18:
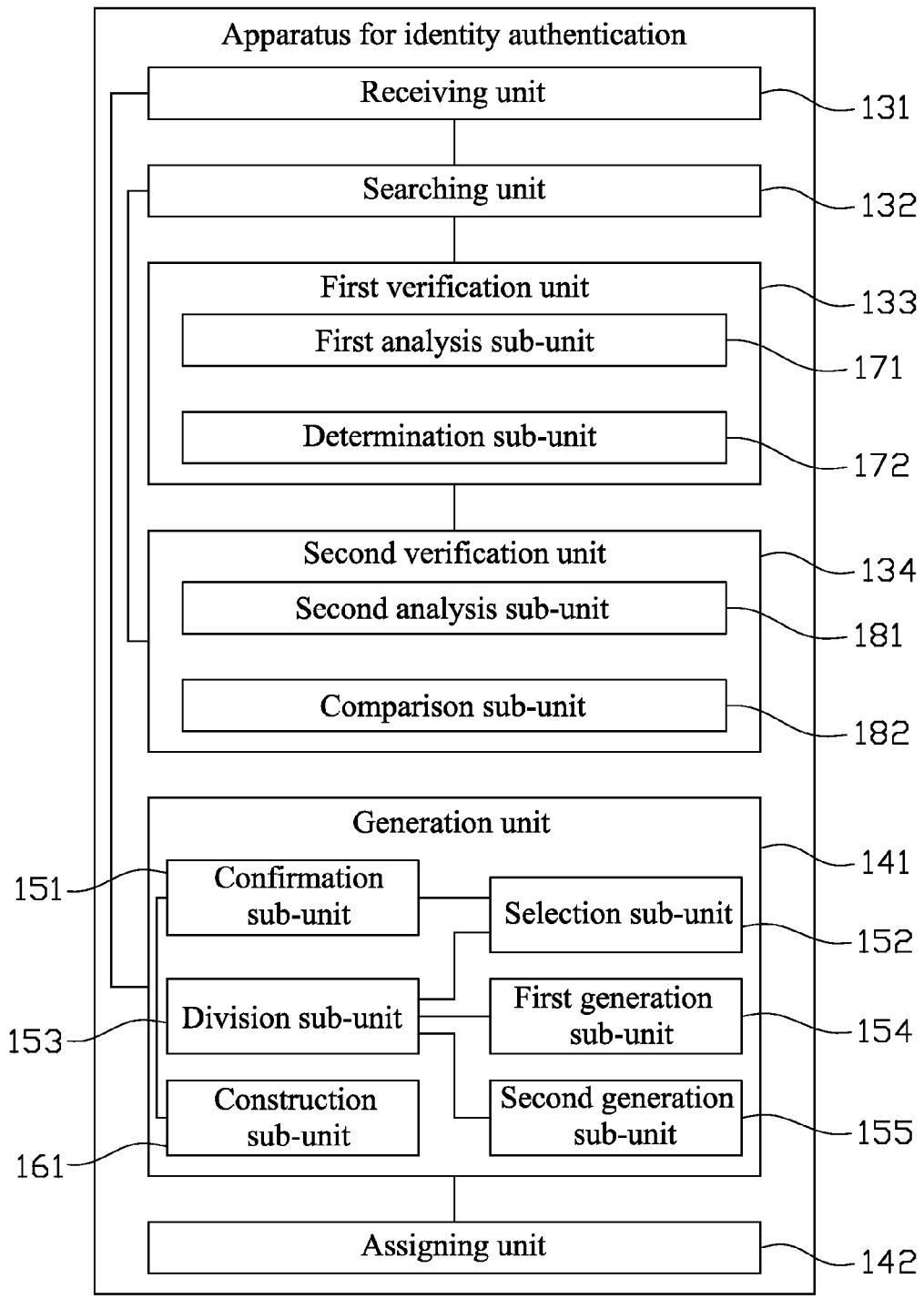
FIG. 18 is a schematic view showing structure of a sixth embodiment of an apparatus for identity authentication according to the present disclosure.

Furthermore, as shown in FIG. 18, the second verification unit 134 further may include:

a second analysis sub-unit 181, configured to analyze to obtain at least a check character based on the check character generation rule;

a comparison sub-unit 182, configured to compare the at least a check character obtained by the second analysis sub-unit 181 against the at least check character generated in generating the access ID, respectively;

when each of the at least a check character being the same, the second verification unit 134 further confirming the access ID being an authorized access ID; and when any of at least a check character being different, the second verification unit 134 further determining the access ID being an unauthorized access ID.

Furthermore, after the assigning unit 142 sends the access ID to the third party developer, the generation unit 141 further uses a new check character generation rule to generate new access ID when the previously used check character generation rule is cracked, wherein the new access ID may include a new version character to mark a version number of the new check character generation rule; and the assigning unit 142 sends the new access ID generated by the generation unit 141 to the third party developer.

Figure 19:
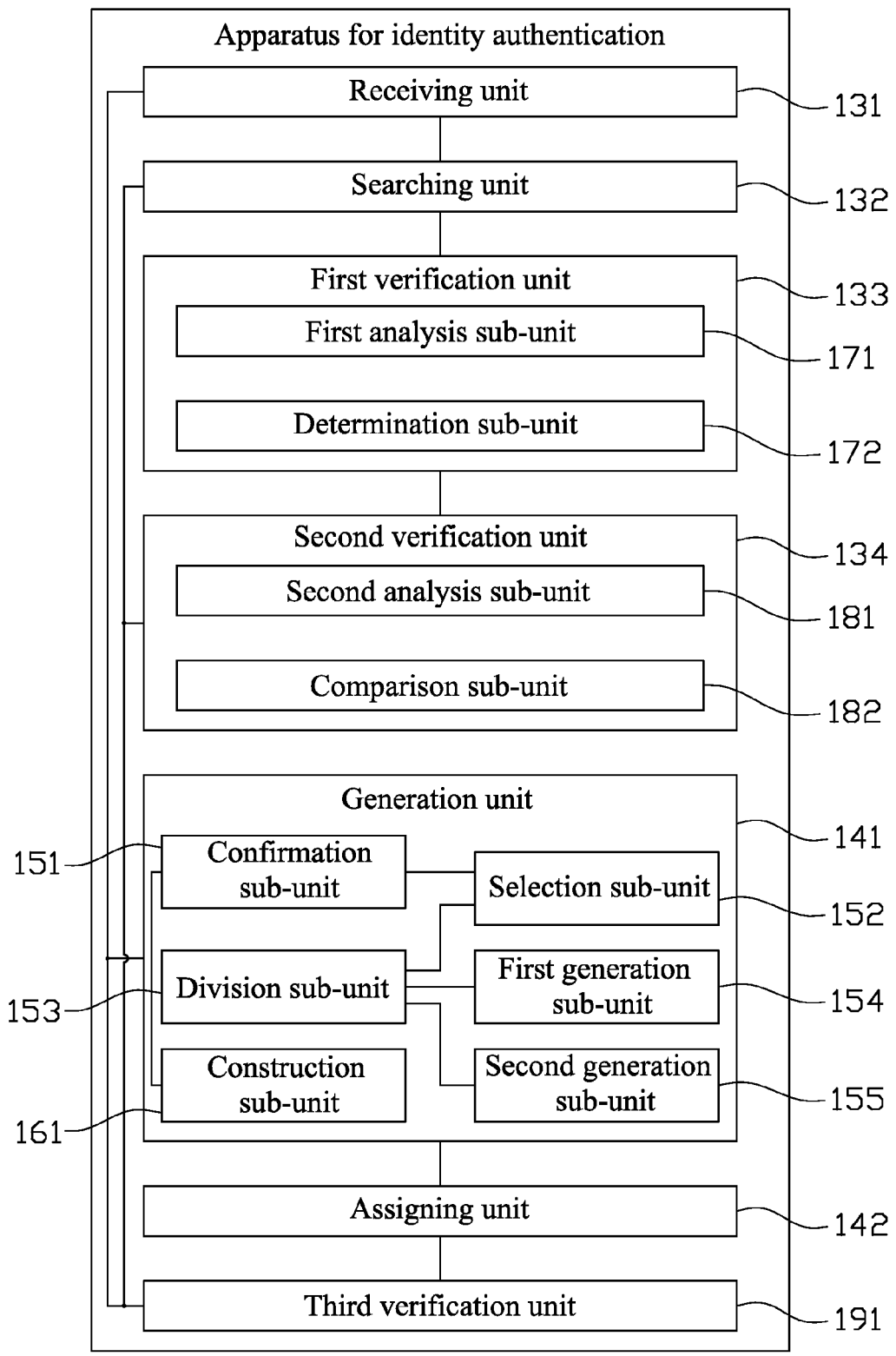
FIG. 19 is a schematic view showing structure of a seventh embodiment of an apparatus for identity authentication according to the present disclosure.

Furthermore, as shown in FIG. 19, the apparatus further includes a third verification unit 191; wherein:

The third verification unit 191 is configured to perform replay attack verification on the API calling request received by the receiving unit 131 after the second verification unit 134 verifies the access ID is an authorized access ID.

The apparatus for identity authentication provided in the embodiment uses the version character to verify the version number of the check character generation rule used by the access ID. When the version verification succeeds, the check character verification is executed. Because the check character is generated from the secondary characters, each of the secondary characters is also indirectly verified to achieve the identity authentication of the access ID. In addition, because the version character is also generated through the secondary characters, the version character verification can also verify the secondary characters in generating the version character in addition to verifying the version number of the check character generation rule.

Furthermore, the apparatus for identity authentication provided in the embodiment can switch to another check character generation rule when the current check character generation rule is cracked and puts the version number of the new rule in the new access ID to assign to the authorized third party developer in order to invalidate the old access ID. As such, the difficulty of cracking access ID is increased.

Figure 20:
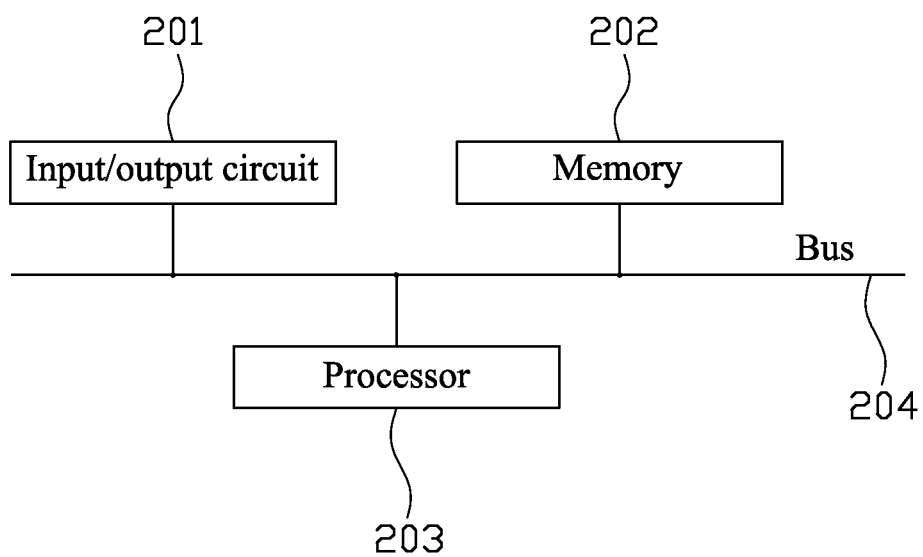
FIG. 20 is a schematic view showing structure of a server for identity authentication according to an embodiment of the present disclosure.

Referring to the realization of the method in FIG. 3, the present disclosure further provides a server for identity authentication. As shown in FIG. 20, the server may include: an input/output circuit 201, a memory 202, a processor 203 and a bus 204 for connecting the input/output circuit 201, the memory 202 and the processor 203, wherein:

the input/output circuit 201 is configured to receive an API calling request from a third party developer, the API calling request carrying an access ID generated in advance by the server and assigned to the third party developer;

the memory 202 is configured to store a version character generation rule, a check character generation rule and a version number of the check character generation rule;

the processor 203 is configured to search for a version character carried in the access ID received by the input/output circuit 201, the version character being for marking a version number of a check character generation rule; based on the version character generation rule stored in the memory 202, verify whether the version number marked by the version character being the same as the version number of the check character generation rule stored in the memory 202; when the version character being verified successfully, search for at least a check character carried in the access ID; and based on the check character generation rule stored in the memory 202, verify respectively on the at least a check character.

The server for identity authentication provided in the embodiment uses the version character to verify the version number of the check character generation rule used by the access ID. When the version verification succeeds, the check character verification is executed. Because the check character is generated from the secondary characters, each of the secondary characters is also indirectly verified to achieve the identity authentication of the access ID. In addition, because the version character is also generated through the secondary characters, the version character verification can also verify the secondary characters in generating the version character in addition to verifying the version number of the check character generation rule.

Furthermore, the server for identity authentication provided in the embodiment can switch to another check character generation rule when the current check character generation rule is cracked and puts the version number of the new rule in the new access ID to assign to the authorized third party developer in order to invalidate the old access ID. As such, the difficulty of cracking access ID is increased.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media may include RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also include any tangible computer-readable medium in connection with the various hardware computer components disclosed herein, when operating to perform a particular function based on the instructions of the program contained in the medium.

The above descriptions are only preferred embodiments of the present disclosure, and are not intended to limit the present disclosure. Any amendments, replacement and modification made to the above embodiments under the spirit and principle of the present disclosure should be included in the scope of the present disclosure.

What is claimed is:

1. A method for identity authentication, at a server side, the method comprising:

generating an access identification (access ID) based on a version character generation rule and a check character generation rule, the step of generating an access ID comprising:

constructing an initialized character array, the initialized character array comprising digits 0-9, lower case letters a-z and upper case letters A-Z, with a total of 62 characters;

confirming a numerical position for a version character and a numerical position for each of at least a check character in the access ID;

selecting a plurality of characters from the initialized character array as secondary characters of the access ID, wherein the secondary characters are characters in the access ID other than the version character and the at least a check character;

dividing the plurality of secondary characters into at least two character generation groups, the at least two character generation groups comprising a version character generation group and at least a check character generation group, wherein the step of dividing the plurality of secondary characters further comprises:

dividing the plurality of secondary characters to obtain the at least two character generation groups based on the number of the secondary characters 'a', the number of version characters 'b', and the number of check characters 'c';

generating the version character based on the version character generation group and the version character generation rule, wherein the step of generating the version character further comprises:

multiplying, in the version character generation group, the numerical position of each character and the American Standard Code for Information Interchange (ASCII) code corresponding to the character to obtain a first-order version value;

performing modulus of 62 of a summation of the plurality of first-order version values to obtain a second-order version value;

performing modulus of 62 of a summation of the second-order version value and the version number of the check character generation rule to obtain a third-order version value; and searching for the character in the initialized character array having the same numerical position as the third-order version value and using the character as the version character;

and generating the at least a check character based on the at least a check character generation group and the check character generation rule;

sending the access ID to a third party developer;

receiving an API calling request from the third party developer, the API calling request carrying the access ID generated in advance by the server and assigned to the third party developer;

searching for the version character carried in the access ID, the version character being for marking a version number of the check character generation rule;

verifying, based on the version character generation rule, whether the version number marked by the version character is the same as a version number of the check character generation rule used by the server;

searching, when the version character being verified successfully, for the at least a check character carried in the access ID; and verifying, based on the check character generation rule, the at least a check character.

2. The method for identity authentication as claimed in claim 1, wherein, the step of generating the at least a check character further comprises:

in a check character generation group, multiplying the numerical position of each character and the ASCII code corresponding to the character to obtain a first-order check value;

performing modulus of 62 of a summation of the plurality of first-order check values to obtain a second-order check value; and searching for the character in initialized character array having the same numerical position as the second-order check value and using the character as the first check character.

3. The method for identity authentication as claimed in claim 2, wherein, the step of based on a version character generation rule, verifying whether the version number marked by the version character being the same as a version number of the check character generation rule used by the server further comprises:

using a reverse rule of the version character generation rule to analyze the version character to obtain a version number;

determining whether the analyzed version number obtained being the same as the version number generated by the server using the check character generation rule and obtaining a result;

when the determination result being the same, performing check character verification; and when the determination result being different, determining the access ID being an unauthorized access ID.

4. The method for identity authentication as claimed in claim 3, wherein, the step of based on the check character generation rule, verifying the at least a check character further comprises:

analyzing to obtain at least a check character based on the check character generation rule;

comparing the at least a check character obtained against the at least check character generated in generating the access ID, respectively;

when each of the at least a check character being the same, confirming the access ID being an authorized access ID; and when any of at least a check character being different, determining the access ID being an unauthorized access ID.

5. The method for identity authentication as claimed in claim 4, wherein, after the step of sending the access ID to the third party developer, the method further comprises:

if the check character generation rule being cracked by a third party developer, a new check character generation rule being used to generate a new access ID, wherein a new version character being used in the generated new access ID to mark a version number of the new check character generation rule; and sending the new access ID to the third party developer.

6. The method for identity authentication as claimed in claim 1, wherein, after the step of based on the check character generation rule, verifying the at least a check character, the method further comprises:

when the access ID is an authorized access ID, performing replay attack verification on the API calling request.

7. A non-transitory computer-readable apparatus for identity authentication, comprising:

a generation unit configured to generate an access ID based on a version character generation rule and a check character generation rule;

an assigning unit configured to assign the access ID generated by the generation unit to a third party developer;

a receiving unit, configured to receive an API calling request from the third party developer, the API calling request carrying the access ID;

a searching unit, configured to search for a version character carried in the access ID received by the receiving unit, the version character being for marking a version number of the check character generation rule;

a first verification unit, configured to verify whether the version number marked by the version character found by the searching unit being the same as a version number of the check character generation rule used by the server, based on the version character generation rule;

the searching unit also configured to search for at least a check character carried in the access ID when the version character being verified successfully by the first verification unit; and a second verification unit, configured to verify the at least a check character found by the searching unit based on the check character generation rule, wherein the generation unit further comprises a construction sub-unit, a confirmation sub-unit, a selection sub-unit, a division sub-unit, a first generation sub-unit, and a second generation sub-unit, the construction sub-unit is configured to construct an initialized character array, wherein the initialized character array comprises digits 0-9, lower case letters a-z and upper case letters A-Z, with a total of 62 characters, the confirmation sub-unit is configured to confirm a numerical position of the version character and a numerical position of the at least a check character, the selection sub-unit is configured to select a plurality of characters from the initialized character array as secondary characters in the access ID, wherein the secondary characters are characters in the access ID other than the version character and the check character confirmed by the confirmation sub-unit, the division sub-unit is configured to divide the plurality of secondary characters selected by the selection sub-unit into at least two character generation groups according to the number of the secondary characters 'a', the number of version characters 'b', and the number of check characters 'c', wherein the at least two character generation groups comprises a version character generation group and at least a check character generation group, the first generation sub-unit is configured to generate the version character according to the version character generation group divided by the division sub-unit and the version character generation rule, multiply the numerical position of each character and the American Standard Code for Information Interchange (ASCII) code corresponding to the character in the version character generation group to obtain a first-order version value, perform modulus of 62 of a summation of the plurality of first-order version values to obtain a second-order version value, perform modulus of 62 of a summation of the second-order version value and the version number of the check character generation rule to obtain a third-order version value, and search for the character in the initialized character array having the same numerical position as the third-order version value and using the character as the version character, and the second generation sub-unit is configured to generate the at least a check character according to the check character generation group divided by the division sub-unit and the check character generation rule.

8. The non-transitory computer-readable apparatus for identity authentication as claimed in claim 7, wherein, the second generation sub-unit is configured to:

in a check character generation group, multiply a numerical position of each character and the ASCII code corresponding to the character to obtain a first-order check value;

perform modulus of 62 of a summation of the plurality of first-order check values to obtain a second-order check value; and search for the character in initialized character array having the same numerical position as the second-order check value and using the character as the first check character.

9. The non-transitory computer-readable apparatus for identity authentication as claimed in claim 8, wherein, the first verification unit comprises a first analysis sub-unit and a determination sub-unit; wherein:

the first analysis sub-unit uses a reverse rule of the version character generation rule to analyze the version character to obtain a version number;

the determination sub-unit determines whether the analyzed version number obtained by the first analysis sub-unit is the same as the version number generated by the server using the check character generation rule and obtains a result;

when the determination result is the same, the first verification unit further instructs the second verification unit to perform check character verification; and when the determination result is different, the first verification unit determines the access ID is an unauthorized access ID.

10. A server for identity authentication, comprising: an input/output circuit, a memory, a processor, and a bus for connecting the input/output circuit, the memory and the processor, wherein:

the input/output circuit is configured to receive an API calling request from a third party developer, the API calling request carrying an access ID generated in advance by the server based on a version character generation rule and a check character generation rule and assigned the access ID to the third party developer;

the memory is configured to store the version character generation rule, the check character generation rule, a version number of the check character generation rule, and at least two character generation groups, wherein the at least two character generation groups comprises a version character generation group and at least a check character generation group; and the processor is configured to:

search for a version character carried in the access ID received by the input/output circuit, the version character being for marking the version number of the check character generation rule, verify, based on the version character generation rule stored in the memory, whether the version number marked by the version character being the same as the version number of the check character generation rule stored in the memory, search, when the version character being verified successfully, for at least a check character carried in the access ID; and verify, based on the check character generation rule stored in the memory, the at least a check character, wherein, to generate the access ID, the processor is further configured to:

construct an initialized character array, wherein the initialized character array comprises digits 0-9, lower case letters a-z and upper case letters A-Z, with a total of 62 characters, confirm a numerical position of the version character and a numerical position of the at least a check character, select a plurality of characters from the initialized character array as secondary characters in access ID, wherein the secondary characters are the characters in the access ID other than the confirmed version character and the confirmed check character, divide the plurality of the selected secondary characters into the at least two character generation groups according to the number of the secondary characters 'a', the number of version characters 'b', and the number of check characters 'c', generate the version character according to the divided version character generation group and the version character generation rule, multiply the numerical position of each character and the American Standard Code for Information Interchange (ASCII) code corresponding to the character in the version character generation group to obtain a first-order version value, perform modulus of 62 of a summation of the plurality of first-order version values to obtain a second-order version value, perform modulus of 62 of a summation of the second-order version value and the version number of the check character generation rule to obtain a third-order version value, search for the character in the initialized character array having the same numerical position as the third-order version value and using the character as the version character, and generate the at least a check character according to the divided check character generation group and the check character generation rule.

* * * * *